US009610885B2

(12) United States Patent
Williams

(10) Patent No.: US 9,610,885 B2
(45) Date of Patent: Apr. 4, 2017

(54) ADJUSTABLE LOAD RESTRAINT SYSTEM

(71) Applicant: Richard Williams, Republic, WA (US)

(72) Inventor: Richard Williams, Republic, WA (US)

( * ) Notice: Subject to any disclaimer, the term of this patent is extended or adjusted under 35 U.S.C. 154(b) by 0 days.

(21) Appl. No.: 14/821,875

(22) Filed: Aug. 10, 2015

(65) Prior Publication Data
US 2017/0043701 A1   Feb. 16, 2017

(51) Int. Cl.
B60P 7/08 (2006.01)
(52) U.S. Cl.
CPC .......... B60P 7/0853 (2013.01); B60P 7/0838 (2013.01); Y10T 24/2125 (2015.01)
(58) Field of Classification Search
CPC ............. Y10T 24/2125; Y10T 24/2138; Y10T 24/2177; Y10T 24/2181; B60P 7/0853; B60P 7/0838
USPC ........................................................ 410/100
See application file for complete search history.

(56) References Cited

U.S. PATENT DOCUMENTS

| 779,007 A | 1/1905 | Smith |
|---|---|---|
| 1,885,128 A | 4/1930 | Montgomery |
| 2,824,717 A | 2/1958 | Yeager |
| 4,500,073 A | 2/1985 | Smith |
| D309,854 S | 8/1990 | Smith |
| 7,634,841 B2 | 12/2009 | Profit |
| 7,913,363 B2 | 3/2011 | Scott |

Primary Examiner — Abigail Morrell

(57) ABSTRACT

An adjustable load restraint system includes a chain binder has handle, a first coupling and a second coupling. Each of the first coupling and the second coupling may be removably secured to an associated one of a pair of chains. The handle may be manipulated such that the first coupling is selectively moved toward and away from the second coupling. Thus, the chain binder selectively urges the pair of chains toward each other and away from each other. A grapple is movably coupled to the second coupling. The grapple may engage the associated chain at a selected one of a pair of locations on the associated chain. Thus, the chain binder may accommodate a variety of distances between the pair of chains.

5 Claims, 2 Drawing Sheets

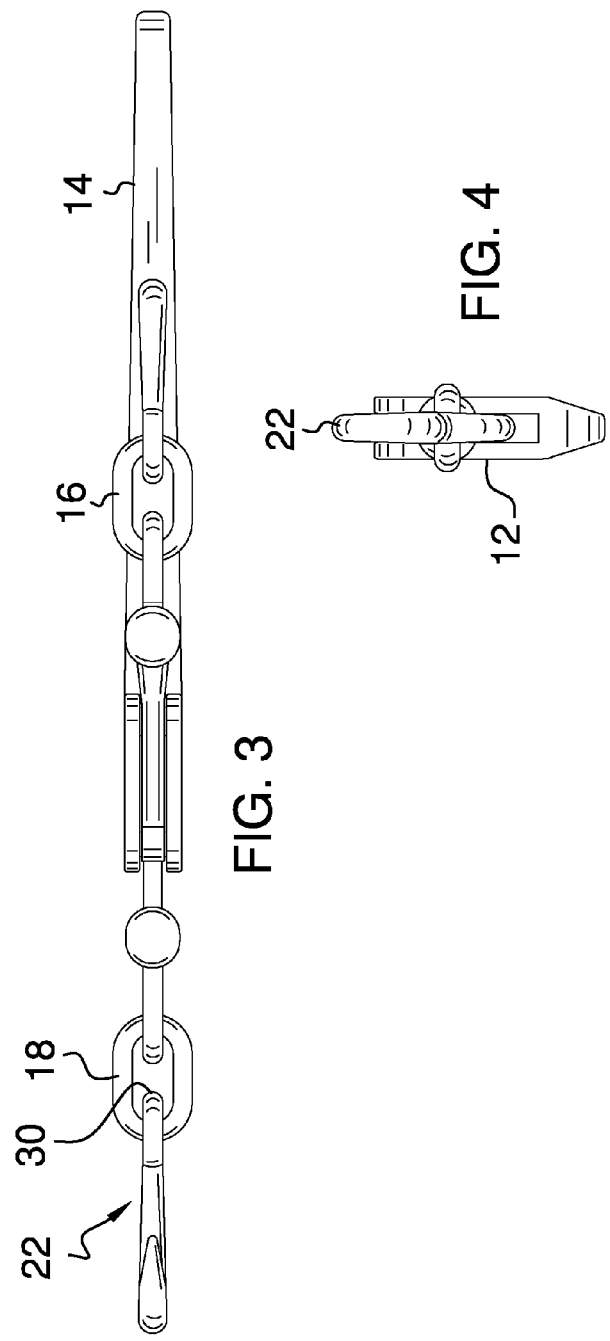
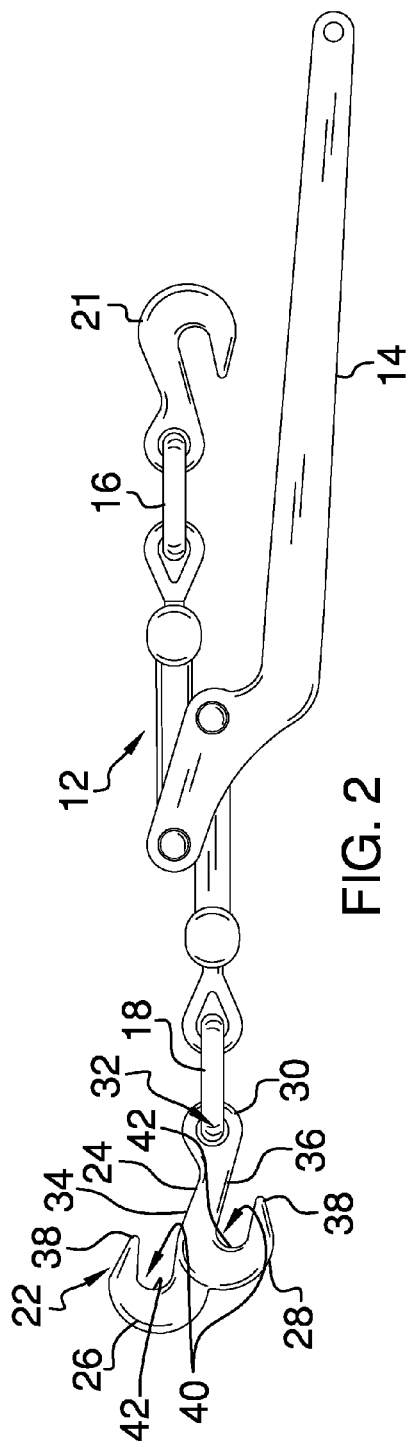
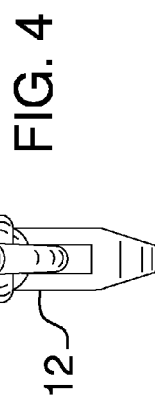
FIG. 2
FIG. 3
FIG. 4

ADJUSTABLE LOAD RESTRAINT SYSTEM

BACKGROUND OF THE DISCLOSURE

Field of the Disclosure

The disclosure relates to restraint devices and more particularly pertains to a new restraint device for tightening a pair of chains to secure a load.

SUMMARY OF THE DISCLOSURE

An embodiment of the disclosure meets the needs presented above by generally comprising a chain binder has handle, a first coupling and a second coupling. Each of the first coupling and the second coupling may be removably secured to an associated one of a pair of chains. The handle may be manipulated such that the first coupling is selectively moved toward and away from the second coupling. Thus, the chain binder selectively urges the pair of chains toward each other and away from each other. A grapple is movably coupled to the second coupling. The grapple may engage the associated chain at a selected one of a pair of locations on the associated chain. Thus, the chain binder may accommodate a variety of distances between the pair of chains.

There has thus been outlined, rather broadly, the more important features of the disclosure in order that the detailed description thereof that follows may be better understood, and in order that the present contribution to the art may be better appreciated.

There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a right side view of an embodiment of the disclosure.

FIG. 3 is a top view of an embodiment of the disclosure.

FIG. 4 is a front view of an embodiment of the disclosure.

DESCRIPTION OF THE PREFERRED EMBODIMENT

Figure 1:
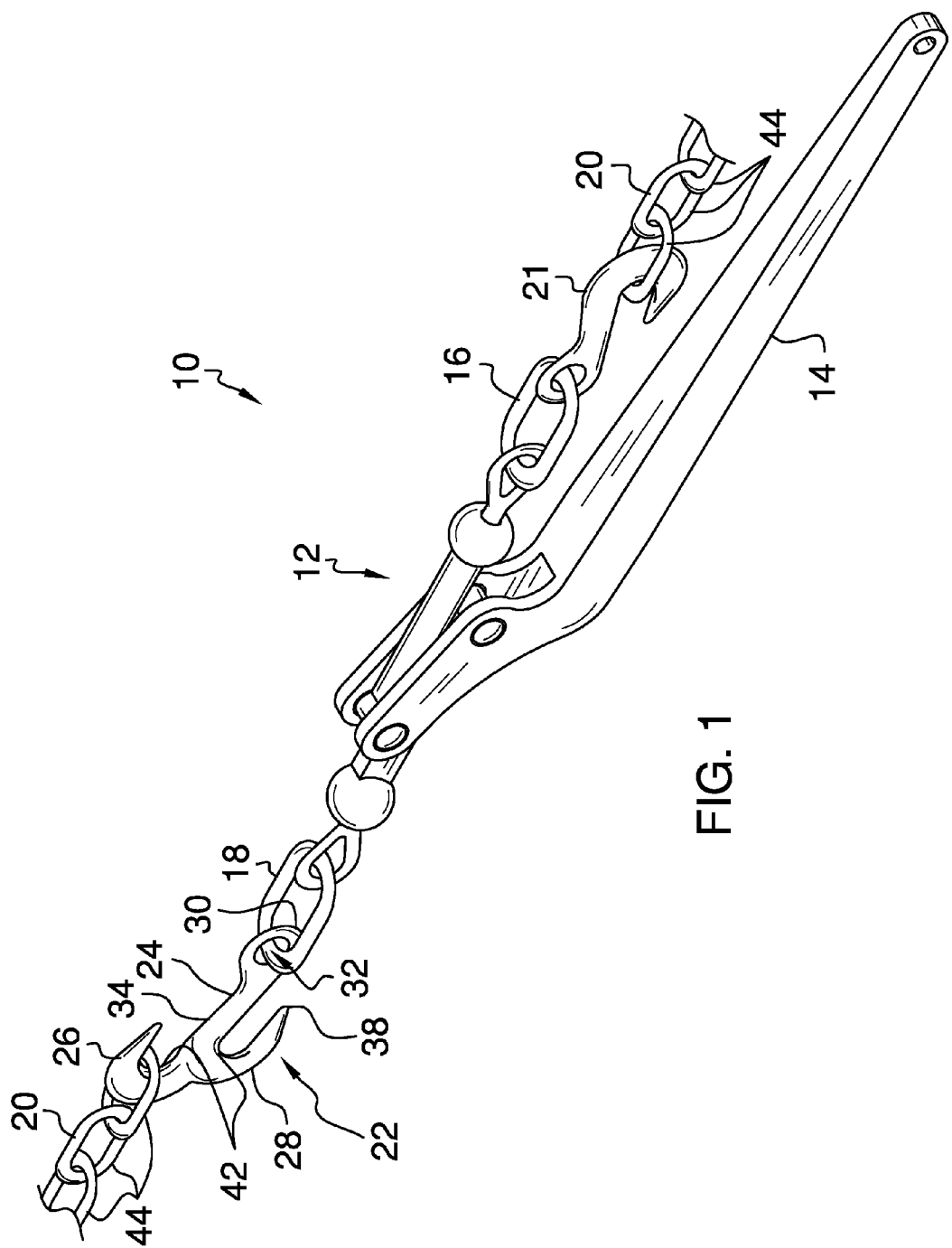
FIG. 1 is a perspective in-use view of an adjustable load restraint system according to an embodiment of the disclosure.

With reference now to the drawings, and in particular to FIGS. 1 through 4 thereof, a new restraint device embodying the principles and concepts of an embodiment of the disclosure and generally designated by the reference numeral 10 will be described.

As best illustrated in FIGS. 1 through 4, the adjustable load restraint system 10 generally comprises a chain binder 12 that has handle 14, a first coupling 16 and a second coupling 18. Each of the first coupling 16 and the second coupling 18 may be removably secured to an associated one of a pair of chains 20. The handle 14 may be manipulated such that the first coupling 16 is selectively moved toward and away from the second coupling 18. Thus, the chain binder 12 selectively urges the pair of chains 20 toward each other and away from each other. Each of the chains 20 may be utilized to secure a load or the like and the chain binder 12 tightens the chains 20 thereby inhibiting the load from shifting. The first coupling 16 may include a hook 21 or the like.

A grapple 22 is provided and the grapple 22 is movably coupled to the second coupling 18. The grapple 22 may engage the associated chain 20 at a selected one of a pair of locations on the associated chain 20. Thus, the chain binder 12 may accommodate a variety of distances between the pair of chains 20. The grapple 22 has a body 24, a first hook 26 and a second hook 28. The body 24 has a distal end 30 with respect to the first hook 26 and the second hook 28 and the body 24 has an opening 32 extending therethrough. The opening 32 is positioned adjacent to the distal end 30. The opening 32 has the second coupling 18 extending therethrough such that the grapple 22 is retained on the second coupling 18.

The body 24 has a top side 34 and a bottom side 36. The first hook 26 extends away from the top side 34 and the second hook 28 extends away from the bottom side 36. Each of the first hook 26 and the second hook 28 curve toward the distal end 30 to define a point 38 of each of the first hook 26 and the second hook 28. The point 38 of each of the first hook 26 and the second hook 28 is spaced from the body 24 to define a chain space 40 between the body 24 and each of the first hook 26 and the second hook 28.

The chain space 40 on each of the first hook 26 and the second hook 28 has a bounding surface 42. The bounding surface 42 of each of the first hook 26 and the second hook 28 may engage the associated chain 20 when the associated chain 20 is positioned within the chain space 40 of a selected one of the first hook 26 and the second hook 28. Each of the chains 20 has a plurality of chain links 44 and each of the chain links 44 may have a length ranging between approximately one inch and two inches. A distance between the bounding surface 42 corresponding to the first hook 26 and the distal end 30 is one half of a chain link 44 greater than a distance between the bounding surface 42 corresponding to the second hook 28 and the distal end 30.

In use, the first coupling 16 is fastened to one of the chains 20. A selected one of the first hook 26 or the second hook 28 is fastened the one of the chains 20. The handle 14 is manipulated to urge the chains 20 toward each other. The chain 20 associated with the second coupling 18 is coupled to the first hook 26 if the handle 14 cannot be fully manipulated into a tightened position when the chain 20 associated with the second coupling 18 is coupled to the second hook 28. The chain 20 associated with the second coupling 18 is coupled to the second hook 28 if the chain 20 is not fully tightened when the handle 14 is fully manipulated into the tightened position and the chain 20 is coupled to the first hook 26.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable load restraint system comprising:
a chain binder having handle, a first coupling and a second coupling, each of said first coupling and said second coupling being configured to be removably secured to an associated one of a pair of chains, said handle being configured to be manipulated such that said first coupling is selectively moved toward and away from said second coupling thereby facilitating said chain binder to selectively urge the pair of chains toward each other and away from each other;
a grapple being movably coupled to said second coupling, said grapple being configured to engage the associated chain at a selected one of a pair of locations on the associated chain thereby facilitating said chain binder to accommodate a variety of distances between the pair of chains; and
wherein said grapple has a body, a first hook and a second hook, said body having a distal end with respect to said first hook and said second hook, said body having an opening extending therethrough, said opening being positioned adjacent to said distal end, said opening having said second coupling extending therethrough such that said grapple is retained on said second coupling, said body having a top side and a bottom side.

2. The system according to claim 1, wherein said first hook extends away from said top side, said second hook extends away from said bottom side, each of said first hook and said second hook curves toward said distal end to define a point of each of said first hook and said second hook, said point of each of said first hook and said second hook are spaced from said body to define a chain space between said body and each of said first hook and said second hook.

3. An adjustable load restraint system comprising:
a chain binder having handle, a first coupling and a second coupling, each of said first coupling and said second coupling being configured to be removably secured to an associated one of a pair of chains, said handle being configured to be manipulated such that said first coupling is selectively moved toward and away from said second coupling thereby facilitating said chain binder to selectively urge the pair of chains toward each other and away from each other;
a grapple being movably coupled to said second coupling, said grapple being configured to engage the associated chain at a selected one of a pair of locations on the associated chain thereby facilitating said chain binder to accommodate a variety of distances between the pair of chains;
said grapple having a first hook and a second hook, each of said first hook and said second hook having a chain space; and
said chain space on each of said first hook and said second hook having a bounding surface wherein said bounding surface of each of said first hook and said second hook is configured to engage the associated chain when the associated chain is positioned within said chain space of a selected one of said first hook and said second hook.

4. The system according to claim 3, wherein a distance between said bounding surface corresponding to said first hook and said distal end is configured to be one half of a length of a chain link of said pair of chains greater than a distance between said bounding surface corresponding to said second hook and said distal end.

5. An adjustable load restraint system comprising:
a chain binder having handle, a first coupling and a second coupling, each of said first coupling and said second coupling being configured to be removably secured to an associated one of a pair of chains, said handle being configured to be manipulated such that said first coupling is selectively moved toward and away from said second coupling thereby facilitating said chain binder to selectively urge the pair of chains toward each other and away from each other; and
a grapple being movably coupled to said second coupling, said grapple being configured to engage the associated chain at a selected one of a pair of locations on the associated chain thereby facilitating said chain binder to accommodate a variety of distances between the pair of chains, said grapple having a body, a first hook and a second hook, said body having a distal end with respect to said first hook and said second hook, said body having an opening extending therethrough, said opening being positioned adjacent to said distal end, said opening having said second coupling extending therethrough such that said grapple is retained on said second coupling, said body having a top side and a bottom side, said first hook extending away from said top side, said second hook extending away from said bottom side, each of said first hook and said second hook curving toward said distal end to define a point of each of said first hook and said second hook, said point of each of said first hook and said second hook being spaced from said body to define a chain space between said body and each of said first hook and said second hook, said chain space on each of said first hook and said second hook having a bounding surface wherein said bounding surface of each of said first hook and said second hook is configured to engage the chain when the chain is positioned within said chain space of a selected one of said first hook and said second hook, a distance between said bounding surface corresponding to said first hook and said distal end being configured to be one half of a length of a chain link of said pair of chains greater than a distance between said bounding surface corresponding to said second hook and said distal end.

* * * * *